(12) United States Patent
Jen

(10) Patent No.: US 10,576,425 B2
(45) Date of Patent: Mar. 3, 2020

(54) UNHOUSED FILTRATION DEVICE AND METHODS OF USE

(71) Applicant: Filtration Solutions, Inc., Hackettstown, NJ (US)

(72) Inventor: Chang-Wei Jen, Bedminster, NJ (US)

(73) Assignee: Filtration Solutions, Inc., Hackettstown, NJ (US)

(*) Notice: Subject to any disclaimer, the term of this patent is extended or adjusted under 35 U.S.C. 154(b) by 164 days.

(21) Appl. No.: 15/516,162

(22) PCT Filed: Feb. 3, 2017

(86) PCT No.: PCT/US2017/016353
§ 371 (c)(1),
(2) Date: Mar. 31, 2017

(87) PCT Pub. No.: WO2017/136626
PCT Pub. Date: Aug. 10, 2017

(65) Prior Publication Data
US 2018/0229188 A1    Aug. 16, 2018

Related U.S. Application Data

(60) Provisional application No. 62/388,659, filed on Feb. 4, 2016.

(51) Int. Cl.
*B01D 63/06* (2006.01)
*B01D 65/08* (2006.01)
*B01D 61/18* (2006.01)

(52) U.S. Cl.
CPC ........... *B01D 63/063* (2013.01); *B01D 61/18* (2013.01); *B01D 65/08* (2013.01); *B01D 2315/06* (2013.01); *B01D 2321/2008* (2013.01)

(58) Field of Classification Search
CPC ...... B01D 61/18; B01D 63/02; B01D 63/068; B01D 63/043; B01D 63/06; B01D 63/025;
(Continued)

(56) References Cited

U.S. PATENT DOCUMENTS 5,202,023 A    4/1993  Trimmer et al.
5,985,151 A    11/1999 Ahmadi
(Continued)

OTHER PUBLICATIONS

International Search Report and Written Opinion dated Apr. 14, 2017 for PCT/US2017/016353.

*Primary Examiner* — Pranav N Patel
(74) *Attorney, Agent, or Firm* — Matthew L. Grell; Jeffrey C. Watson; Grell & Watson Patent Attorneys LLC

(57) ABSTRACT

A porous tube or conduit formed in a series of loops coiled around a center line, the series of loops having a first loop, the first loop having a first extension configured with a first open end in fluid communication with the first loop, the series of loops having an end loop, the end loop having a second extension configured with a second open end in fluid communication with the end loop, wherein the first open end and the second open end are positioned proximate the center line and the first loop, and, thus, functions to provide a more efficient filter having less plugging or clogging of the filtration membrane, reduced the need for self-cleaning of the porous tube, minimize the effects of pressure drop across a porous tube, installed inside a tank, accommodating shipping, handling, and storage, simplified system arrangement, thereby provide a more efficient filtration device, system, process.

27 Claims, 9 Drawing Sheets

(58) Field of Classification Search
CPC .... B01D 63/027; B01D 63/063; B01D 65/08; B01D 69/04; B01D 2313/23; B01D 2313/54; B01D 2317/022; B01D 2315/06; B01D 2321/2016; B01D 2321/2008
See application file for complete search history.

(56) References Cited

U.S. PATENT DOCUMENTS

| | | |
|---|---|---|
| 6,203,707 B1 | 3/2001 | Hartmann |
| RE37,759 E | 6/2002 | Belfort |
| 6,461,513 B1 | 10/2002 | Jen |
| 2014/0319045 A1 | 10/2014 | Shevitz et al. |

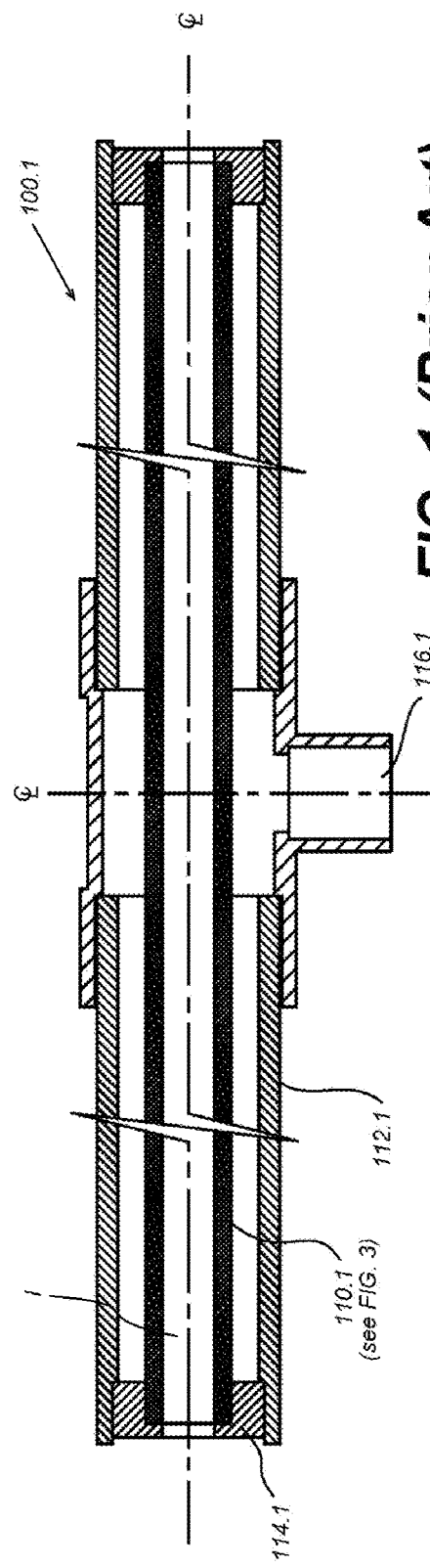
FIG. 1 (Prior Art)
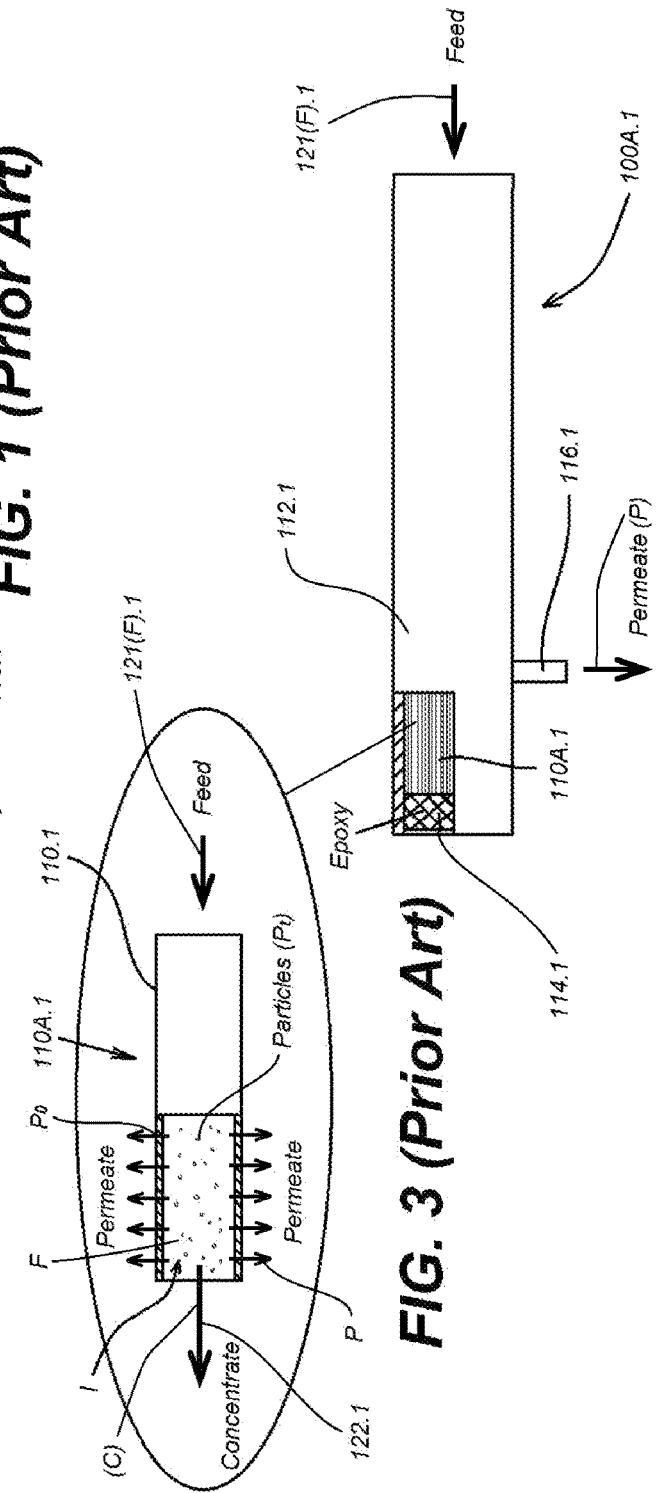
FIG. 3 (Prior Art)
FIG. 2 (Prior Art)

FIG. 7A  FIG. 7B

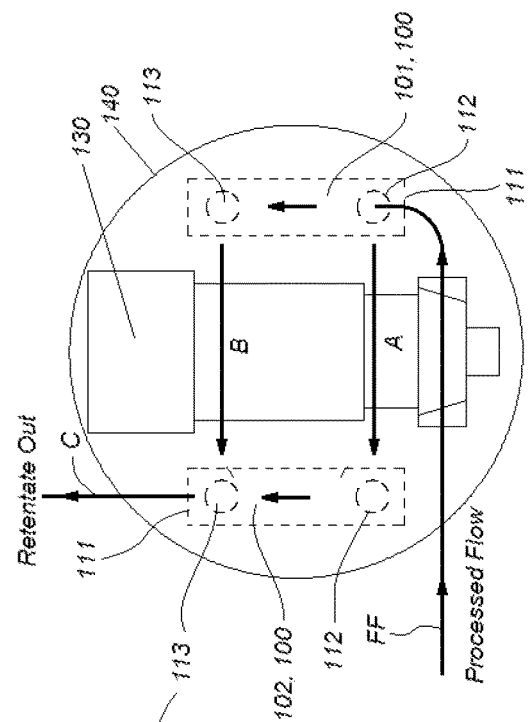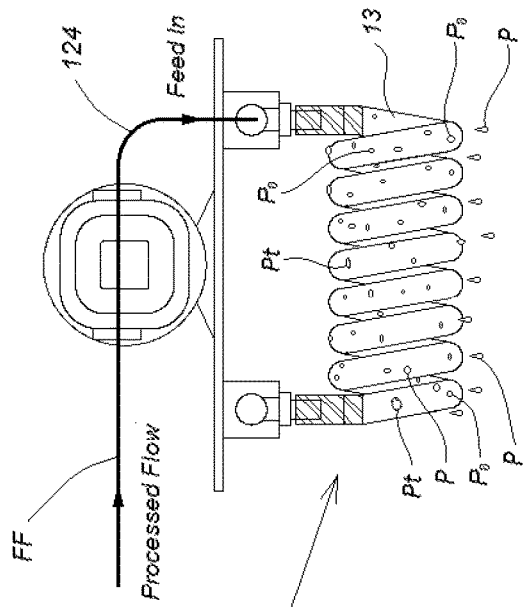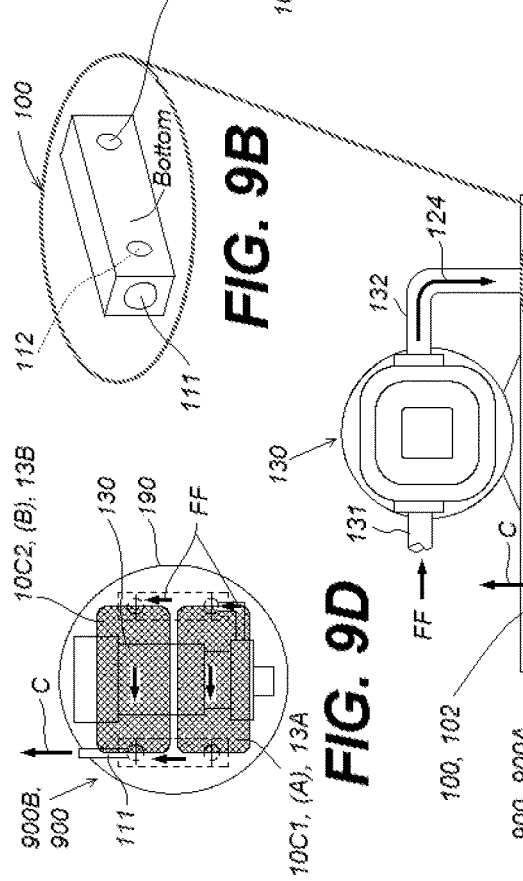

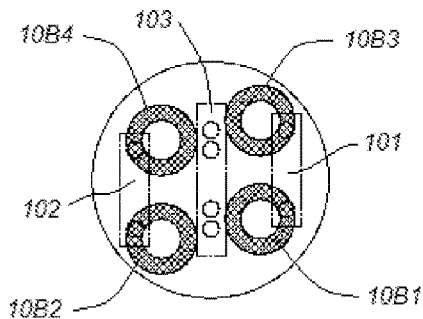
FIG. 10C1
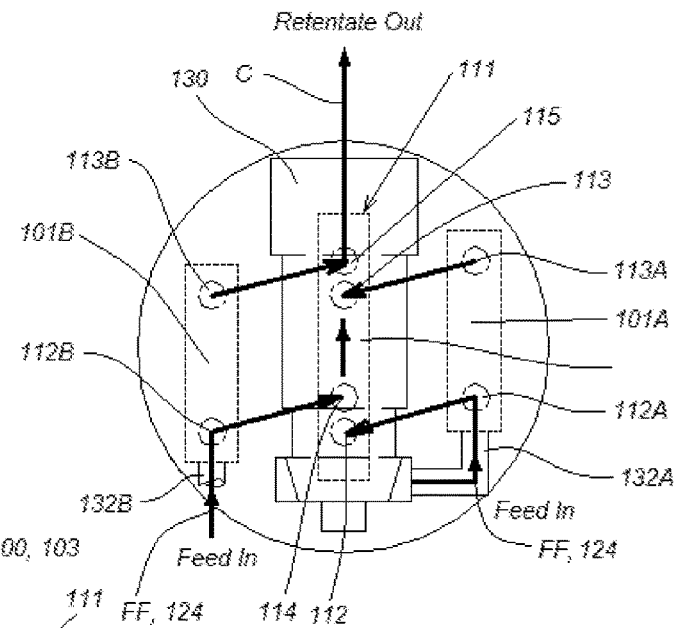
FIG. 10C2
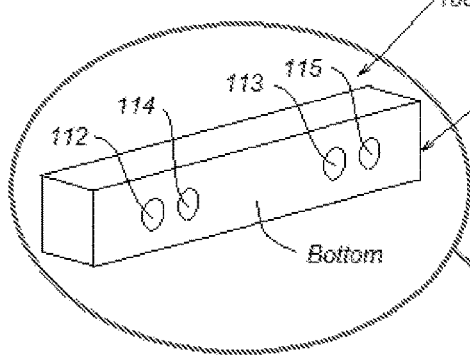
FIG. 10B
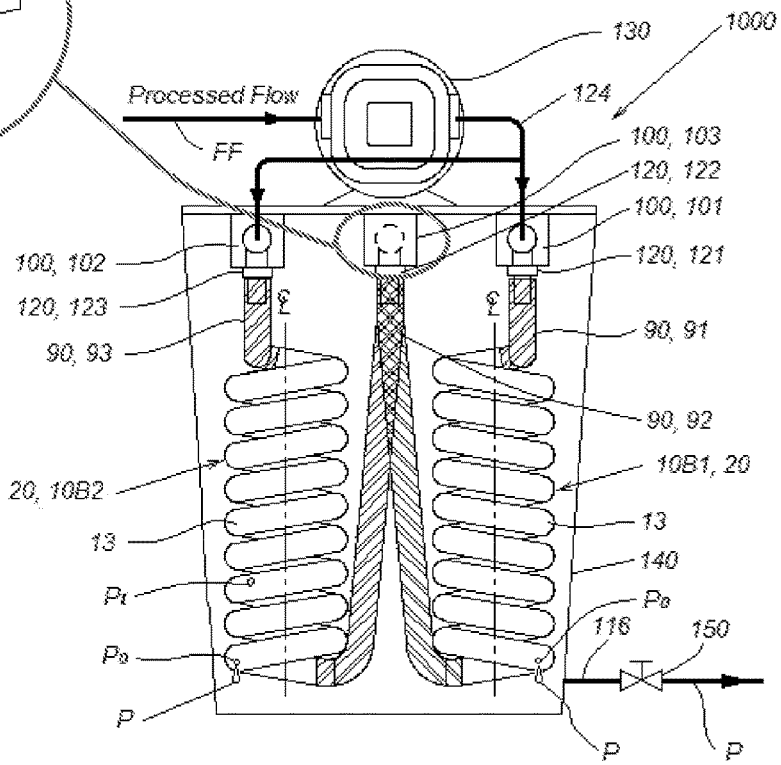
FIG. 10A

UNHOUSED FILTRATION DEVICE AND METHODS OF USE

CROSS-REFERENCE TO RELATED APPLICATIONS

To the full extent permitted by law, the present U.S. Non-provisional Patent Application hereby claims priority to and the full benefit of PCT application Serial No. PCT/US17/16353, filed on Feb. 3, 2017; which claimed benefit to U.S. Provisional Application entitled "UNHOUSED FILTRATION DEVICE," having assigned Ser. No. 62/388,659, filed on Feb. 4, 2016, incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

Technical Field of the Invention

This disclosure relates generally to tubular membrane filtration and, more specifically, to unhoused filtration.

Description of the Related Art

The art has seen various filtration devices employing different methods for removing particulate or impurities from a feed fluid. For example, so-called dead end filtration systems force all of the feed fluid through a filter to separate impurities therefrom. Dead end filters designs may place a filter either directly across a flow path or at an oblique angle to the flow path. One disadvantage to this approach is that all of the fluid must pass through the filter and the velocity of the fluid about the filter will continuously decrease eventually to zero unless the filter is cleared or replaced.

Other traditional treatment systems include chemical treatments followed by filtration and separation technologies such as sedimentation tanks (clarifiers), sand/media filters, various microfiltration (MF) and ultrafiltration technologies (UF), such as hollow fiber and reverse osmosis (RO) systems, to name a few.

Some filter designs employ a spiral fluid flow path to separate heavier particulate from the fluid medium. These centrifugal particulate separation devices employ a spiral path to generate centrifugal forces which force the heavier particulate to the outside of the spiral flow path.

Another approach shown in FIG. 1 is tubular membrane filtration is a pressure driven, cross-flow filtration process using a micro-porous membrane to separate suspended solids, such as chemicals or metals, from liquids such as water. Tubular filtration device 100.1 includes a hollow permeable conduit, such as membrane tube 110.1 enclosed within tubular housing 112.1, such as a pipe, conduit, or tube, shown in FIG. 1. The ends of the tubes are sealed with for example epoxy directly against housing 112.1 to form end plates 114.1. During the filtration process, pressurized effluent, such as feed 121.1 is fed into the membrane tube 110.1 from one end, such as first end 110.1. As feed 121.1 flows in through membrane tube 110.1, particles Pt are separated by membrane tube 110.1 and particles Pt remain inside or within interior I of membrane tube 110.1. The pressurized feed 121.1 is pressurized to force permeate P (a clean fluid with little or no particles Pt) through the filter media, such as to penetrate or pass through openings (pores Po) therein membrane tube 110.1, whereby permeate P is then collected inside housing 112.1 and directed to a manifold or a tank through discharge port such as fluid out (permeate P) through outlet 116.1. As the fluid flows through the filter media, particles Pt are trapped by the fibers that make up the filter media. Particles Pt or contaminants separated by the membrane, such as membrane tube 110.1 remain inside membrane tube 110.1 and are carried away by the remainder of the feed fluid F (121.1), as retentate fluid, such as concentrate C (122.1). One disadvantage to this approach is that backwashing is routinely applied in this filtration process to alleviate membrane plugging or clogging, such as membrane tube 110.1. During backwashing, the pressure that feeds feed 121.1 to membrane tube 110.1 is isolated and alternatively pressure is applied or built up in housing 112.1 reversing flow of permeate P, and thus, forces particles Pt that are lodged therein pores Po of membrane tube 110.1 to be removed or dislodge therein to interior I of membrane tube 110.1 to alleviate membrane plugging or clogging and prepare membrane tube 110.1 for further filtration.

Moreover, FIG. 2 illustrate an alternative tubular membrane filtration device 100A.1 includes a plurality of hollow permeable conduits, such as membrane tubes 110A.1 configured therein housing 112.1. Similar to FIG. 1 with both ends of membrane tubes 110A.1 potted to allow thru-flow of fluid pathways for feed 121.1 and Concentrate 122.1 while encapsulating membrane tubes 110A.1 with for example epoxy directly against housing 112.1 to form seals at the ends 114.1. During the filtration process, pressurized effluent, such as feed 121.1 is fed into the membrane tubes 110A.1 from one end, such as first end 114.1. As feed 121.1 flows through membrane tubes 110A.1, particles Pt are separated by each membrane tube 110.1 and particles Pt remain inside or within interior I of each of membrane tubes 110A.1. The filtered fluid F that penetrates or pass through openings (pores Po) of membrane tubes 110A.1 (the "filtrate" or "permeate P") is then collected inside housing 112.1 and directed to a manifold or a tank through discharge port such as outlet 116.1. Moreover as in FIG. 1 particles Pt or contaminants separated by the membrane, such as membrane tubes 110A.1 remain inside membrane tubes 110A.1 and are carried away by the remainder of the feed F, as concentrate C (122.1). Like FIG. 1, one disadvantage to this approach is that backwashing is routinely applied in this filtration process to alleviate membrane plugging or clogging, such as membrane tube 110.1. During backwashing, the pressure that feeds feed 121.1 to membrane tubes 110A.1 is isolated and alternatively pressure is applied or built up in housing 112.1 reversing flow of permeate P, and thus, forces particles Pt that are lodged therein pores Po of membrane tubes 110A.1 pores to be removed or dislodge therein to interior I of membrane tubes 110A.1 to alleviate membrane plugging or clogging and prepare membrane tubes 110A.1 for further filtration.

In this prior art filtration process, housing 112.1 provides the function for membrane tube protection, permeate P collection, and serves as a pressure vessel in backwashing. Moreover, filter media removes and retains larger particles Pt passing through openings or pores Po of the filter media, but allows the carrier fluid (the filtrate or permeate P) to pass through filter media and exit via outlet 116.1.

In this prior art filtration process, an elongate annular gap is formed therebetween membrane tube 110/110A.1, an elongate porous filter mounted in an elongated cavity of housing 112.1. The elongate annular gap is formed between the outer filter surface of membrane tube 110/110A.1 and the interior surface of the housing 112.1 so as to define a fluid flow passageway or guide. Moreover the filter includes an open first end, an opposed closed second end.

One disadvantage and inherent weakness common to the traditional cross-flow designs of the prior art, including they all exhibit a pressure drop from the feed inlet to the outlet. The result is that more fouling tends to occur at the inlet end, which has a higher trans-membrane pressure drop than is present at the outlet end. Another disadvantage of the prior art is concentration polarization. Concentration polarization is a phenomenon commonly found in a membrane separation process, in which the non-permeating or slowly permeating components in the solution (feed flow) accumulate adjacent to the membrane surface, elevating osmotic pressure above that which would exist in the absence of polarization. The effect of concentration polarization is to reduce the membrane flux rate and its selectivity.

Therefore, it is readily apparent there is a recognizable unmet need for an unhoused filtration device and methods of use that is configured to address at least some aspects of the problems discussed above common to the traditional cross-flow designs, which specifically functions with less membrane plugging or clogging of the filtration membrane and reduces the need for self-cleaning of the filter, minimizes uneven fouling, reduces concentration polarization and thus increase the membrane flux rate, minimizes the effects of pressure drop across a filter media, and thereby provide a more efficient filtration device, system, and/or process.

SUMMARY

Briefly described, in an example embodiment, the present disclosure overcomes the above-mentioned disadvantages and meets the recognized need for unhoused filtration device and methods of use, that generally includes a porous tube or conduit formed in a series of loops coiled around a center line, the series of loops having a first loop, the first loop having a first extension configured with a first open end in fluid communication with the first loop, the series of loops having an end loop, the end loop having a second extension configured with a second open end in fluid communication with the end loop, wherein the first open end and the second open end are positioned proximate the center line and the first loop, and, thus, functions to provide a more efficient filter having less plugging or clogging of the filtration membrane, reduced the need for self-cleaning of the porous tube, minimize the effects of pressure drop across a porous tube, and thereby provide a more efficient filtration device, system, and/or process.

According to its major aspects and broadly stated, the disclosure of the unhoused filtration system and methods of use that generally includes one or more porous tube unhoused filtration device formed in a coil or series of loops in fluid communication with a pressurized feed fluid, wherein permeate is pushed through pores therein one or more porous tube and collected in a container and concentrate with particles are continually lifted from the interior surface via Dean Flow eddy currents and together discharged therefrom unhoused filtration device and, thus, functions to provide a more efficient filter having less plugging or clogging of the filtration membrane, reduced the need for self-cleaning of the porous tube, minimize the effects of pressure drop across a porous tube, and thereby provide a more efficient filtration device, system, and/or process.

In an exemplary embodiment, a filter for filtering a pressurized feed fluid with suspended particles therethrough and discharging a concentrate fluid with suspended particles, the filter includes a filtration tube, the filtration tube configured in a series of loops coiled around a center line having a first loop and an end loop, wherein the first loop includes a first extension in fluid communication with the first loop, wherein the end loop includes a second extension in fluid communication with the end loop.

In still a further exemplary embodiment of a method of filtering includes the steps of providing one or more filtration tube, the filtration tube configured in a series of loops coiled around a center line having a first loop and an end loop, wherein the first loop includes a first extension in fluid communication with the first loop, wherein the end loop includes a second extension in fluid communication with the end loop, and a pump in fluid communication with the first extension of one or more the filtration tube and a container, generating Dean Flow currents therein the feed fluid in at least opposing pairs of corkscrew vortices, collecting a permeate filtered therethrough the one or more filtration tube, and discharging a concentrate fluid with suspended particles.

Accordingly, a feature of the unhoused filtration device and methods of use is the ability of the series of loops coiled around a center line to provide a secondary flow current to fluid flowing therethrough.

Another feature of the unhoused filtration device and methods of use is the ability to the series of the porous tube to be of dimension so as to impart Dean Flow currents to fluid flowing therethrough.

Still another feature of the unhoused filtration loops coiled around a center line to enable Dean Flow currents to form therein. Dean Flow currents are opposing pairs of corkscrew vortices formed in the fluid flowing therethrough, which travel along the device and methods of use is its ability of the series of loops coiled and provide a shear cleaning current across the interior surface of the porous tube (filter media) so as to conduct away and prevent particles being entrapped by the filter media, i.e. to prevent concentration polarization.

Yet another feature of the unhoused filtration device and methods of use is its ability to minimized uneven fouling and the filtration performance can be enhanced by the Dean Flow in this unhoused filtration device disclosed.

Yet another feature of the unhoused filtration device and methods of use is its ability to provide a mass transport advantage in the unhoused version greatly reduces the concentration polarization issue in the prior art.

Yet another feature of the unhoused filtration device and methods of use is its ability to enable backwashing that is commonly used in a filtration process. The backwashing can be performed by evacuating, pulling vacuum in the tube (i.e. from the permeate side) to achieve the same purpose.

Yet another feature of the unhoused filtration device and methods of use is its ability to provide a porous tube filter without opposed first and second open ends and an elongated straight porous filter, which requires a large foot print.

Yet another feature of the unhoused filtration device and methods of use is its ability to not provide an elongated porous tube filter mounted in an elongated housing positioned therearound the porous tube, wherein the outer filter surface and the interior surface of the housing wall define an elongate annular gap therebetween, which requires a large foot print.

Yet another feature of the unhoused filtration device and methods of use is its ability to provide coiled membrane tube in a spiral form, it not only provides a flow path that generates Dean Flow in the tube, but also significantly shortens the length of membrane modules with the same membrane areas. For example, a six (6) linear foot tube can be made into a coil with a two (2) inch inside diameter that is less than seven (7) inches in length. Thus, the shortened length of membrane tubes make unhoused membrane modules practical with regards to size of filter installation footprint.

Yet another feature of the unhoused filtration device and methods of use is its ability to provide coiled membrane tube in a spiral form rather than a passageway or channel or groove integrated therein a gap between the filter media and its housing whether the passageway is formed therein the filter membrane, the housing, or a combination thereof. A coiled membrane tube configuration enables more efficient cleaning of the filter membrane via pulling a vacuum only on the filter membrane versus a vacuum spread over the filter membrane and housing.

Yet another feature of the unhoused filtration device and methods of use is its ability to provide coiled tubular membrane filter making shipping and handling more manageable compared to straight tubular membrane filters with the same linear length. The unhoused membrane modules have the advantage of minimum size and weight. The coiled form allows a significant reduction of tube length for a compact design.

Yet another feature of the unhoused filtration device and methods of use is its ability to provide coiled tubular membrane filters which can be mounted under a tank cover and installed inside a tank. This not only makes a design compact but also minimizes piping and fittings, which results in significant cost savings.

Yet another feature of the unhoused filtration device and methods of use is its ability to provide coiled tubular membrane filters, wherein backwashing of the filter membrane may be performed by pulling a vacuum from the inside of membrane tubes instead of applying a positive pressure from the outside of membrane tubes.

Yet another feature of the unhoused filtration device and methods of use is its ability to utilize secondary flow currents developed by the spiral flow path therein coiled tubular membrane filter, Dean Flow currents. Dean Flow currents describe a particular flow pattern developed when fluid is forced through a spiraling fluid flow path. It can occur in a very wide flow regime from laminar to high turbulent flow. Dean Flow currents are developed in opposing pairs of corkscrew vortices which travel along the spiral fluid flow path and provide a shear cleaning current across the filter media surface so as to conduct away particles entrapped by the filter media to extend the operating period of a filter unit between required backwashing or maintenance.

Yet another feature of the unhoused filtration device and methods of use is its ability to provide for filtration using an efficient and low-energy process due to less clogging—controls cake layer formation and effective membrane self-cleaning at low flow velocities, and longevity of filter.

Yet another feature of the unhoused filtration device and methods of use is its ability to integrate one or more unhoused filtration device therein an industrial or surface wastewater treatment system.

Yet another feature of the unhoused filtration device and methods of use is its ability to eliminate the cost of the tubular housing of conventional straight TMF (tubular membrane filter).

Yet another feature of the unhoused filtration device and methods of use is its ability to be mounted under a tank cover or above a collection tank.

Yet another feature of the unhoused filtration device and methods of use is during the flow process, clean fluid (permeate) will penetrate the membrane tube wall leaving dirty flow trapped inside the tube. The permeate generated by the filters can be collected by a holding tank or any convenient collecting device.

Yet another feature of the unhoused filtration device and methods of use is its ability to provide an unhoused membrane filtration device that is to have tubular membranes in a coiled form allowing a secondary flow (called Dean Flow) to be generated, which can minimize membranes from fouling.

Yet another feature of the unhoused filtration device and methods of use is its ability to provide a sterilizing device into a compact system, e.g. a UV light bulb insert into the inside space of a coiled tubular membrane.

Yet another feature of the unhoused filtration device and methods of use is its ability to be integral with a sterilizing device to provide potable water at the point of use.

These and other features of the unhoused filtration device and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present unhoused filtration device and methods of use thereof will be better understood by reading the Detailed Description of the Preferred and Selected Alternate Embodiments with reference to the accompanying drawing Figures, in which like reference numerals denote similar structure and refer to like elements throughout, and in which:

FIG. 1 is a cross-sectional side view of a prior art housed cross flow filtration assembly;

FIG. 2 is a side view of a prior art housed cross flow filtration assembly with a partial cross-sectional view of an assembly with a plurality of hollow permeable conduits;

FIG. 3 is a partial cross-sectional of the filtration assembly of FIG. 1 and FIG. 2 showing detail;

FIG. 9A is a front side view of a filtration system having one or more exemplary embodiments of the unhoused filtration devices;

FIG. 9B is a perspective view of an exemplary embodiment of a manifold used in the unhoused filtration devices of FIG. 9A;

FIG. 9C is a side view of a filtration system having one or more exemplary embodiments of the unhoused filtration devices;

FIG. 9D is a top view of a filtration system having two exemplary embodiments of the unhoused filtration devices;

FIG. 9E is a top block diagram of a filtration system having two manifolds to connect two exemplary embodiments of the unhoused filtration devices;

FIG. 10A is a front side view of a filtration system having one or more alternative exemplary embodiments of the unhoused filtration devices;

FIG. 10B is a perspective view of an alternate exemplary embodiment of a manifold used in the unhoused filtration devices of FIG. 10A;

FIG. 10C1 is a top view of a filtration system having two alternative exemplary embodiments of the unhoused filtration devices;

FIG. 10C2 is a top block diagram of a filtration system having two alternative manifolds to connect two exemplary embodiments of the unhoused filtration devices;

DETAILED DESCRIPTION

In describing the exemplary embodiments of the present disclosure, as illustrated in FIGS. 1-12, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 4:
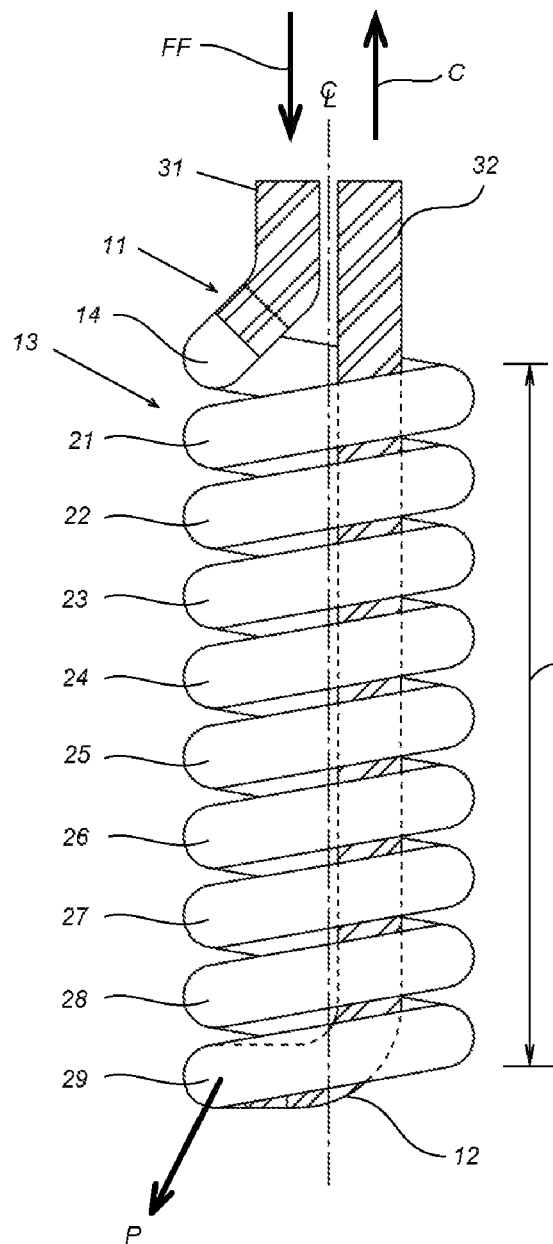
FIG. 4 is a front side view of an exemplary embodiment of the unhoused filtration device.
Figure 5:
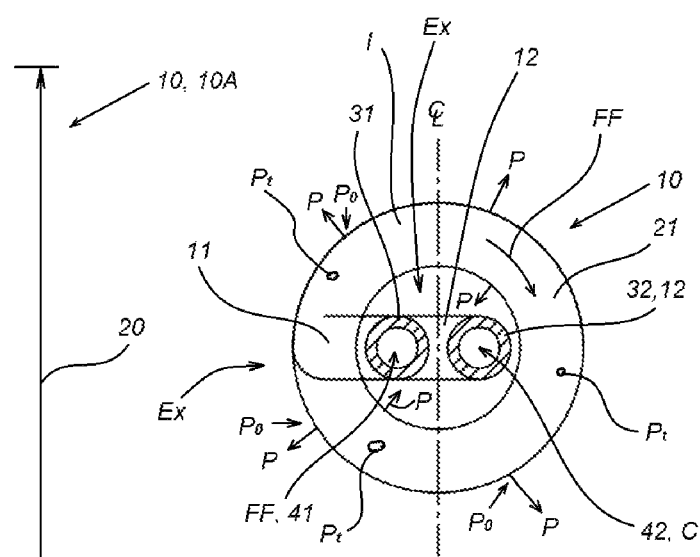
FIG. 5 is a top view of an exemplary embodiment of the unhoused filtration device, according to FIG. 4.

Referring now to the FIGS. 4 and 5, there is illustrated a unhoused filtration device and process for removing suspended substance from an effluent, such as feed fluid FF entering a filter, such as unhoused filtration device 10, 10A. Unhoused filtration device 10, 10A may include an elongated membrane or conduit or tube filter, such as filtration tube 13 partially configured in a series of loops 20 in fluid communication and coiled around a center line CL. Preferably series of loops 20 may include a spiral or coiled tube, such as one or more or plurality of loops 20 in fluid communication and coiled around a center line CL, such as first loop 21, second loop 22, third loop 23, fourth loop 24, fifth loop 25, sixth loop 26, seventh loop 27, eighth loop 28, and ninth loop or end loop 29. Moreover, first loop 21 may include a coupler or extension, such as first extension 11 configured having first tube end 31 and first open end 41 in fluid communication with first loop 21. Furthermore, end loop 29 may include second extension 12 configured having second tube end 32 and second open end 42 in fluid communication with end loop 29.

In one exemplary embodiment of unhoused filtration device 10, 10A, first tube end 31 and first open end 41 and second tube end 32 and second open end 42 may terminate at opposite ends of plurality of loops 20.

In another exemplary embodiment of unhoused filtration device 10, 10A, first tube end 31 and first open end 41 and second tube end 32 and second open end 42 may terminate at one end of plurality of loops 20 via elongated second extension 12, wherein first tube end 31 is in fluid communication with first open end 41 and second tube end 32 (which may be configured as a linear extension therebetween or within plurality of loops 20, more specifically extends therefrom end loop 29 to first loop 21) is in fluid communication with second open end 42 and second open end 42 may be positioned proximate center line CL and may extend proximate first loop 21.

It is contemplated herein that first tube end 31 and second tube end 32 may be positioned parallel to center line CL, wherein first open end 41 and second open end 42 may be positioned proximate one another.

It is contemplated herein that plurality of loops 20 may be configured circular, oval, curved, arcing, angled or any like manner to generate secondary flow current therein.

Filtration tube 13 may be formed of any porous or semi permeable, or permeable, or hollow fiber or other material, capable of directing feed fluid FF through coiled form, such as plurality of loops 20. Moreover, filtration tube 13 may preferably be constructed of permeable materials with tightly controlled pore sizes that are available in a variety of natural and synthetic fiber, composites, laminated composite material, cast materials, polymers as these materials (filter media) offers a variety of forms and shapes. It is contemplated herein that other suitable permeable materials may be utilized or the like, whether formed of multiple layers with different materials, or the like, may be utilized, provided such material has sufficient strength, pore sizes, supports backwashing, exhibits outstanding chemical resistance, offers long service life, high water recovery rates, pH tolerance, small system footprint, and/or durability as would meet the purpose described herein.

Referring now to the FIG. 5, there is illustrated an exemplary embodiment of top view of unhoused filtration device 10, 10A. Unhoused filtration device 10, 10A may include first loop 21 which may further include first angled extension 11 in fluid communication with first loop 21 and configured having first tube end 31 and first open end 41. Unhoused filtration device 10, 10A may further include second extension 12 in fluid communication with end loop 29 and configured having second tube end 32 and second open end 42.

It is contemplated herein that first extension 11 (first tube end 31) and second extension 12 (second tube end 32) may be positioned (or extend a position) proximate one another or proximate center line CL.

It is contemplated herein that first open end 41 and second open end 42 may be positioned proximate one another or proximate center line CL.

In use during the filtration process, pressurized effluent, such as feed fluid FF may be fed into filtration tube 13 from one end, such as first open end 41 of first tube end 31 wherein feed fluid FF traverses therethrough plurality of loops 20. As feed fluid FF flows through filtration tube 13, particles Pt are separated by filtration tube 13 and particles Pt remain inside or within interior I of filtration tube 13. The pressurized feed fluid FF is pressurized to force liquid or fluid, such as permeate P through the filter media of filtration tube 13, such as to penetrate or pass through openings (pores Po) therein filter media of filtration tube 13, whereby filtered fluid, such as permeate P is then pushed outside filtration tube 13, such as to an exterior Ex of filtration tube 13. Moreover, as feed fluid FF flows through the filter media of filtration tube 13, particles Pt are trapped by the fibers that make up the filter media of filtration tube 13. Particles Pt or contaminants separated by filter media of filtration tube 13 remain inside or within interior I of filtration tube 13 and are carried by plurality of loops 20 thereto end loop 29 in fluid communication with second extension 12 having second tube end 32 and second open end 42. Remaining feed fluid FF and particles Pt exit filtration tube 13 via second tube end 32 in fluid communication with second open end 42, as concentrate C.

Figure 6:
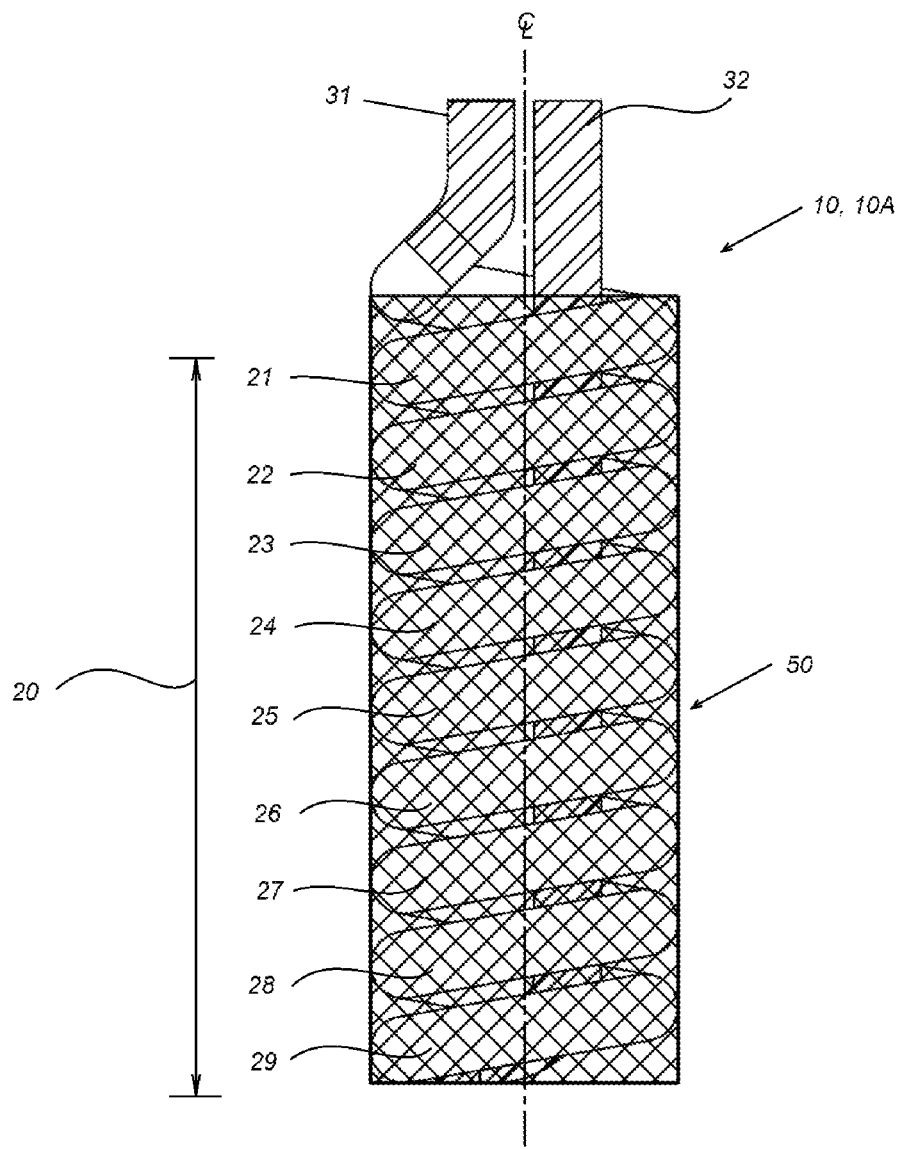
FIG. 6 is a side view of an exemplary embodiment of the unhoused filtration device according to FIG. 4 enclosed in a meshed sleeve.

Referring now to the FIG. 6, there is illustrated an exemplary embodiment of a side view of unhoused filtration device 10, 10A. Unhoused filtration device 10, 10A may include a porous sleeve, such as meshed sleeve 50. Meshed sleeve 50 may be utilized to form or encase first loop 21, second loop 22, third loop 23, fourth loop 24, fifth loop 25, sixth loop 26, seventh loop 27, eighth loop 28, and ninth loop or end loop 29 therein a spiral configuration coiled around center line CL and may be slid over plurality of loops 20 to retain the coil shape. Meshed sleeve 50 may be utilized to protect plurality of loops 20 from impact or puncture as well as meshed sleeve 50 may be utilized to maintain or hold plurality of loops 20 in a spiral formation coiled around center line CL.

Referring now to the FIGS. 7A and 7B, there is illustrated an exemplary embodiment of a side view of unhoused filtration device 10, 10B. Unhoused filtration device 10, 10B may include an enclosed linear conduit, such as filtration tube 13 partially configured in a series of loops 20 in fluid communication and coiled around a center line CL. Preferably series of loops 20 may include one or more or plurality of loops 20 in fluid communication and coiled around a center line CL, such as first loop 21, second loop 22, third loop 23, fourth loop 24, fifth loop 25, sixth loop 26, seventh loop 27, eighth loop 28, and ninth loop or end loop 29. Moreover, first loop 21 may include first extension 11 configured having first tube end 31 and first open end 41 in fluid communication with first loop 21. Furthermore, end loop 29 may include second extension 12 configured having second tube end 32 and second open end 42 in fluid communication with end loop 29.

In an exemplary embodiment of unhoused filtration device 10, 10B, first tube end 31 and first open end 41 and second tube end 32 and second open end 42 may terminate at one end of plurality of loops 20 via elongated second extension 12, wherein first tube end 31 is in fluid communication with first open end 41 and second tube end 32 (which may be configured as a linear extension outside or exterior to plurality of loops 20, more specifically extends therefrom end loop 29 to first loop 21) is in fluid communication with second open end 42 and second open end 42 may be positioned proximate center line CL and may extend proximate first loop 21.

It is contemplated herein that first tube end 31 and second tube end 32 may be positioned parallel to center line CL, wherein first open end 41 and second open end 42 may be positioned proximate one another.

In another exemplary embodiment, unhoused filtration device 10, 10B may include a radiation source, such as ultraviolet light 70 having one or more power terminals 71. Ultraviolet light 70 may be positioned approximate plurality of loops 20 and more specifically ultraviolet light 70 may be inserted within one or more plurality of loops 20 or therebetween first loop 21, second loop 22, third loop 23, fourth loop 24, fifth loop 25, sixth loop 26, seventh loop 27, eighth loop 28, and ninth loop or end loop 29, wherein ultraviolet light 70 may be positioned proximate or parallel to center line CL to form a compact filtration design with an integrated sterilizing function.

Figure 7:
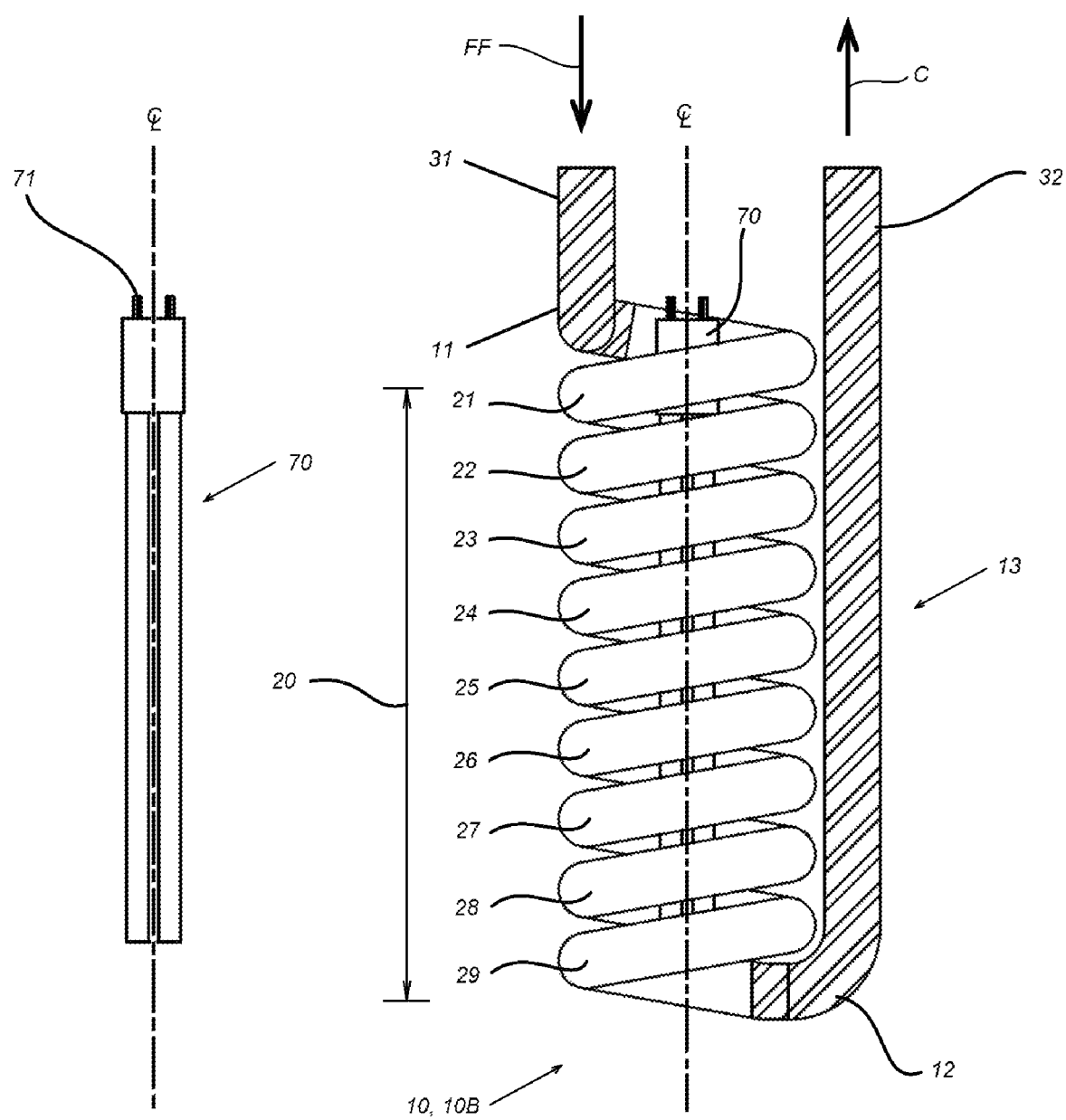
FIG. 7A is a side view of a UV light or other representative radiation source.
FIG. 7B is a side view of another exemplary embodiment of the unhoused filtration device in combination with a UV light of FIG. 7A.

It is further contemplated herein that one or more filtration tube 13 of FIGS. 4, 6 and 7 having series of loops 20 in fluid communication or coiled around a center line CL may be utilized to form unhoused filtration device 10.

Figure 8:
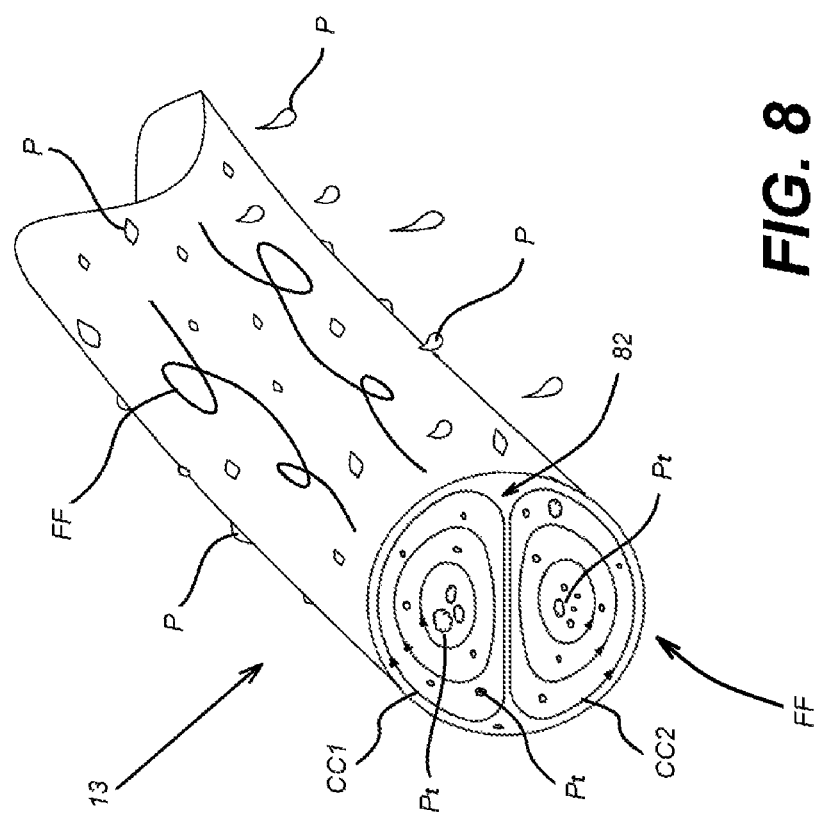
FIG. 8 is a cross-sectional perspective view of the filtration tube of an exemplary embodiment of the unhoused filtration device.

Referring now to the FIG. 8, there is illustrated an exemplary embodiment of a cross-sectional view of filtration tube 13 of unhoused filtration device 10. Filtration tube 13 is preferably configured as one or more or plurality of loops 20 in fluid communication and coiled around a center line CL, such as first loop 21, second loop 22, third loop 23, fourth loop 24, fifth loop 25, sixth loop 26, seventh loop 27, eighth loop 28, and ninth loop or end loop 29 enables unhoused filtration device 10 to produce Dean Flow currents therein filtration tube 13.

It is contemplated herein that cross-sectional view of filtration tube 13 may be configured as hollow in other cross-sectional shapes other than circular, such as oval, rectangle, triangle, multi-angled or the like capable of providing Dean Flow currents.

It is further contemplated herein that pressurized feed fluid FF is pressurized to force the filtrate, or permeate P through the filter media of filtration tube 13, wherein permeate P pass through openings (pores Po) therein filtration tube 13. During the flow process, clean fluid permeate P will penetrate the filter media of filtration tube 13 leaving dirty flow captured inside filtration tube 13.

Dean Flow currents are developed therein feed fluid FF as at least opposing pairs of corkscrew vortices, such as first corkscrew vortex CC1 and second corkscrew vortex CC2, which travel along the spiral fluid flow path therein filtration tube 13 and provide a shear cleaning current across the filter media interior surface 82 so as to conduct away particles Pt entrapped by the filter media and to maintain or hold particles Pt to the interior I of filtration tube 13 away from interior surface 82. Experimenters have reported that the vortex (flow first corkscrew vortex CC1 and second corkscrew vortex CC2) exists in both the laminar flow and turbulent flow region, and the vortex structure persists up to 1000 times the critical flow rate, which is the transition between laminar and turbulent flow. Fluid flowing through a spiral flow path at less than the Dean Flow critical velocity will not develop the opposing corkscrew currents therein while fluid flowing too quickly through a spiral flow path degenerates into a purely turbulent flow regime. Dean Flow currents have been demonstrated to better maintain the flux rate across a filter media so as to extend the operating period of a filter unit between required backwashing or maintenance.

The movement of these vortices, such as first corkscrew vortex CC1 and second corkscrew vortex CC2, creates micro-backwashing events that continually move across the filter media interior surface 82, allowing the filter to operate essentially indefinitely without plugging (i.e. these backwashing events continuously clean the filter surface). Because very little energy is lost in the creation and maintenance of these vortices, embodiments of a filtration system of the present disclosure can operate over a broad pressure range in any practical application. Embodiments of the present disclosure thus provide for filtration using an efficient, low-energy process.

It is still further contemplated herein in FIGS. 4-8 that pressurized feed fluid FF may be sourced from or positioned exterior Ex of filtration tube 13 and permeate P may pass through openings (pores Po) therein filtration tube 13 passing through the filter media of filtration tube 13 and into the Interior I of filtration tube 13. Herein the filtration process is reversed from inside out flow of permeate P through filter media of filtration tube 13 (leaving dirty flow captured inside or interior I of filtration tube 13) to an outside in flow of permeate P passing through filter media of filtration tube 13 (leaving dirty flow outside filtration tube 13).

Referring now to the FIGS. 9A, 9B, 9C, 9D and 9E there is illustrated an exemplary embodiment of filtration system 900. Filtration system 900A may include one or more unhoused filtration device 10, 10C may include a linear conduit, such as filtration tube 13 partially configured in a series of loops 20 in fluid communication and coiled around a center line CL. Preferably series of loops 20 may include a spiral or coiled tube, such as one or more or plurality of loops 20 in fluid communication and coiled around a center line CL, such as first loop 21, second loop 22, third loop 23, fourth loop 24, fifth loop 25, sixth loop 26, seventh loop 27, (eighth loop 28) and end loop 28/29. Moreover, first loop 21 may include a connector 90, such as first connector tube 90, 91 configured in fluid communication with first loop 21. Furthermore, end loop 28/29 may include second connector tube 90, 92 configured in fluid communication with end loop 28/29. Furthermore, filtration system 900 may include one or more manifolds 100 having two or more ports, such as first port 111 in fluid communication with second port 112 and third port 113. First port 111, second port 112, and third port 113 may include one or more quick disconnector, hose barbs, or manifold connectors 120, such as first manifold connector 121 and second manifold connector 122 to provide fluid communication therebetween unhoused filtration device 10, 10C and manifold 100. More specifically, first manifold 101 having second port 112 with first manifold connector 121 connected thereto and first connector tube 91 configured to connect first loop 21 of unhoused filtration device 10C thereto first manifold connector 121, wherein second port 112 of first manifold 101, first connector tube 91, and first loop 21 of unhoused filtration device 10C are in fluid communication therewith one another. Moreover, second manifold 102 having second port 112 with second manifold connector 122 connected thereto and second connector tube 92 configured to connect end loop 28/29 of unhoused filtration device 10C thereto second manifold connector 122, wherein second port 112 of second manifold 102, second connector tube 92, and end loop 28/29 of unhoused filtration device 10C are in fluid communication therewith one another. Furthermore, pressurized effluent, such as fluid feed FF via pump 130 may flow from intake conduit 131 through pump 130 and therethrough outtake conduit 132, which is in fluid communication therewith first port 111 of first manifold 101.

Referring now to FIG. 9C pressurized feed 124 is pressurized to force permeate P through the filter media, filtration tube 13, such as to permeate P to pass through openings (pores Po) therein filtration tube 13, whereby permeate P is then collected in a collection device, tank, basin, or pan, such as container 140. Container 140 may include a discharge port, such as outlet 116 with or without valve 150 to discharge permeate P. Moreover as in FIG. 1 particles Pt or contaminants separated by the membrane, such as filtration tube 13 remain inside filtration tube 13 and are carried away by the remainder of pressurized feed 124, as concentrate C and exit first port 111 of second manifold 102.

Referring now to FIGS. 9D and 9E there is illustrated another exemplary embodiment of filtration system 900B. Filtration system 900B may include one or more filtration tube 13, as first unhoused filtration device 10C1 (configured similar to FIG. 9A) and second unhoused filtration device 10C2. More specifically, second unhoused filtration device 10C2 may include first manifold 101 having third port 113 with first manifold connector 121B connected thereto and first connector tube 91B configured to connect first loop 21B of unhoused filtration device 10C2 thereto first manifold connector 121B, wherein third port 113 of first manifold 101, first connector tube 91B, and first loop 21B of unhoused filtration device 10C2 are in fluid communication therewith one another. Moreover, second manifold 102 having third port 113 with second manifold connector 122B connected thereto and second connector tube 92B configured to connect end loop 28B/29B of unhoused filtration device 10C2 thereto second manifold connector 122B, wherein third port 113 of second manifold 102, second connector tube 92B, and end loop 28B/29B of unhoused filtration device 10C2 are in fluid communication therewith one another. Furthermore, pressurized effluent, such as fluid feed FF via pump 130 may flow from intake conduit 131 through pump 130 and therethrough outtake conduit 132, which is in fluid communication therewith first port 111 of first manifold 101.

Referring again to FIG. 9C pressurized feed 124 is pressurized to force permeate P through the filter media, filtration tube 13A of first unhoused filtration device 10C1 (configured similar to FIG. 9A) and filtration tube 13B of second unhoused filtration device 10C2, such as permeate P to penetrate or pass through openings (pores Po) therein filtration tube 13A/B, whereby permeate P is then collected in a tank, basin, or pan, such as container 140. Container 140 may include a discharge port, such as outlet 116 with or without valve 150 to discharge permeate P. Moreover as in FIG. 1 particles Pt or contaminants separated by the membrane, such as filtration tube 13A/B remain inside filtration tube 13A/B and are carried away by the remainder of pressurized feed 124, as concentrate C and exit first port 111 of second manifold 102.

Referring now to the FIGS. 10A, 10B, and 10C1/10C2 there is illustrated an exemplary embodiment of filtration system 1000. Filtration system 1000 may include one or more unhoused filtration device 10, 10B may include a linear conduit, such as filtration tube 13 partially configured in a series of loops 20 in fluid communication and coiled around a center line CL as shown in FIG. 7. Preferably series of loops 20 may include one or more or plurality of loops 20 in fluid communication and coiled around a center line CL, such as first loop 21, second loop 22, third loop 23, fourth loop 24, fifth loop 25, sixth loop 26, seventh loop 27, eighth loop 28, and ninth loop or end loop 28/29. Moreover, first loop 21 may include a connector 90, such as first connector tube 90, 91 configured in fluid communication with first loop 21. Furthermore, end loop 28/29 may include second connector tube 90, 92 configured in fluid communication with end loop 28/29. Furthermore, filtration system 1000 may include input manifold, such as one or more manifolds 100B having two or more ports, such as first port 111 in fluid communication with second port 112 and third port 113 and fourth port 114 and fifth port 115. First port 111, second port 112, third port 113, fourth port 114 and fifth port 115 may include one or more quick disconnector, hose barbs, or manifold connectors 120, such as first manifold connector 121, second manifold connector 122, and third manifold connector 123 to provide fluid communication therebetween unhoused filtration device 10B and manifold 100B.

Unhoused Filtration Device 10B1

More specifically, first manifold 101A having second port 112A with first manifold connector 121 connected thereto and first connector tube 91 configured to connect first loop 21 of unhoused filtration device 10B1 thereto first manifold connector 121, wherein second port 112A of first manifold 101A, first manifold connector 121, first connector tube 91, and first loop 21 of unhoused filtration device 10B1 are in fluid communication therewith one another. Moreover, an output manifold, such as third manifold 103 having second port 112 with second manifold connector 122 connected thereto and second connector tube 92 configured to connect end loop 28/29 of unhoused filtration device 10B1 thereto second manifold connector 122, wherein second port 112 of third manifold 103, second manifold connector 122, second connector tube 92, and end loop 28/29 of unhoused filtration device 10B1 are in fluid communication therewith one another.

Furthermore, pressurized effluent, such as fluid feed FF via pump 130 may flow from intake conduit 131 through pump 130 and therethrough outtake conduit 132, which is in fluid communication therewith first port 111 of first manifold 101A.

Unhoused Filtration Device 10B3

Still more specifically, first manifold 101A having third port 113A with first manifold connector 121 connected thereto and first connector tube 91 configured to connect first loop 21 of unhoused filtration device 10B3 thereto first manifold connector 121, wherein third port 113A of first manifold 101A, first manifold connector 121, first connector tube 91, and first loop 21 of unhoused filtration device 10B3 are in fluid communication therewith one another. Moreover, third manifold 103 having third port 113 with second manifold connector 122 connected thereto and second connector tube 92 configured to connect end loop 28/29 of unhoused filtration device 10B3 thereto second manifold connector 122, wherein third port 113 of third manifold 103, second manifold connector 122, second connector tube 92, and end loop 28/29 of unhoused filtration device 10B3 are in fluid communication therewith one another.

Unhoused Filtration Device 10B2

More specifically, second manifold 101B having second port 112B with first manifold connector 121 connected thereto and first connector tube 91 configured to connect first loop 21 of unhoused filtration device 10B2 thereto first manifold connector 121, wherein second port 112B of second manifold 101B, first manifold connector 121, first connector tube 91, and first loop 21 of unhoused filtration device 10B2 are in fluid communication therewith one another. Moreover, third manifold 103 having fourth port 114 with second manifold connector 122 connected thereto and second connector tube 92 configured to connect end loop 28/29 of unhoused filtration device 10B2 thereto second manifold connector 122, wherein fourth port 114 of third manifold 103, second manifold connector 122, second connector tube 92, and end loop 28/29 of unhoused filtration device 10B2 are in fluid communication therewith one another.

Furthermore, pressurized effluent, such as fluid feed FF via pump 130 may flow from intake conduit 131 through pump 130 and therethrough outtake conduit 132, which is in fluid communication therewith first port 111 of second manifold 101B.

Unhoused Filtration Device 10B4

Still more specifically, second manifold 101B having third port 113B with first manifold connector 121 connected thereto and first connector tube 91 configured to connect first loop 21 of unhoused filtration device 10B4 thereto first manifold connector 121, wherein third port 113B of second manifold 101B, first manifold connector 121, first connector tube 91, and first loop 21 of unhoused filtration device 10B4 are in fluid communication therewith one another. Moreover, third manifold 103 having fifth port 115 with second manifold connector 122 connected thereto and second connector tube 92 configured to connect end loop 28/29 of unhoused filtration device 10B4 thereto second manifold connector 122, wherein fifth port 115 of third manifold 103, second manifold connector 122, second connector tube 92, and end loop 28/29 of unhoused filtration device 10B5 are in fluid communication therewith one another.

In another exemplary embodiment, unhoused filtration device 10B1, 10B2, 10B3, 10B4 may include a radiation source, such as ultraviolet light 70 having one or more power terminals 71. Ultraviolet light 70 may be positioned approximate plurality of loops 20 and more specifically ultraviolet light 70 may be inserted therebetween one or more plurality of loops 20 or therebetween first loop 21, second loop 22, third loop 23, fourth loop 24, fifth loop 25, sixth loop 26, seventh loop 27, eighth loop 28, and ninth loop or end loop 28/29, wherein ultraviolet light 70 may be positioned proximate or parallel to center line CL.

Referring now to FIG. 9C (and similar in FIGS. 10A, 10C2) pressurized feed 124 is pressurized to force permeate P through the filter media, filtration tube 13, such as to penetrate or pass through openings (pores Po) therein filtration tube 13, whereby permeate P is then collected in a tank, basin, or pan, such as container 140. Container 140 may include a discharge port, such as outlet 116 with or without valve 150 to discharge permeate P. Moreover as in FIG. 1 particles Pt or contaminants separated by the membrane, such as filtration tube 13 remain inside filtration tube 13 and are carried away by the remainder of pressurized feed 124, as concentrate C and exit first port 111 of third manifold 103.

Referring now to FIG. 10C1/10C2 there is illustrated another exemplary embodiment of filtration system 1000. Furthermore, pressurized effluent, such as fluid feed FF via pump 130 may flow from intake conduit 131 through pump 130 and therethrough outtake conduit 132A/132B, which is in fluid communication therewith first port 111 of first manifold 101A and second manifold 101B, respectively in fluid communication with one or more filtration tube 13. First manifold 101A distributes fluid feed FF thereto second port 112A with first manifold connector 121 connected thereto and first connector tube 91 configured to connect first loop 21 of unhoused filtration device 10B1 and third port 113A with first manifold connector 121 connected thereto and first connector tube 91 configured to connect first loop 21 of unhoused filtration device 10B3. Second manifold 101B distributes fluid feed FF thereto second port 112B with first manifold connector 121 connected thereto and first connector tube 91 configured to connect first loop 21 of unhoused filtration device 10B2 and third port 113B with first manifold connector 121 connected thereto and first connector tube 91 configured to connect first loop 21 of unhoused filtration device 10B4. Likewise, third manifold 103 receives concentrate C from second port 112 with second manifold connector 122 connected thereto and second connector tube 92 configured to connect end loop 28/29 of unhoused filtration device 10B1, fourth port 114 with second manifold connector 122 connected thereto and second connector tube 92 configured to connect end loop 28/29 of unhoused filtration device 10B2, third port 113 with second manifold connector 122 connected thereto and second connector tube 92 configured to connect end loop 28/29 of unhoused filtration device 10B3, and fifth port 115 with second manifold connector 122 connected thereto and second connector tube 92 configured to connect end loop 28/29 of unhoused filtration device 10B4, whereby concentrate C may be aggregated from unhoused filtration device 10B1, unhoused filtration device 10B2, unhoused filtration device 10B3, and unhoused filtration device 10B4 and discharged therefrom third manifold 103 via first port 111.

Referring again to FIG. 9C (and similar in FIGS. 10A, 10C2) pressurized feed 124 is pressurized to force permeate P through the filter media, filtration tube 13 of unhoused filtration device 10B1, unhoused filtration device 10B2, unhoused filtration device 10B3, and unhoused filtration device 10B4 (configured similar to FIG. 9A), such as permeate P to penetrate or pass through openings (pores Po) therein filtration tube 13, whereby permeate P is then collected in a tank, basin, or pan, such as container 140. Container 140 may include a discharge port, such as outlet 116 with or without valve 150 to discharge permeate P. Moreover as in FIG. 1 particles Pt or contaminants separated by the membrane, such as filtration tube 13 remain inside filtration tube 13 and are carried away by the remainder of pressurized feed 124, as retentate or concentrate C and exit first port 111 of third manifold 103.

Figure 11:
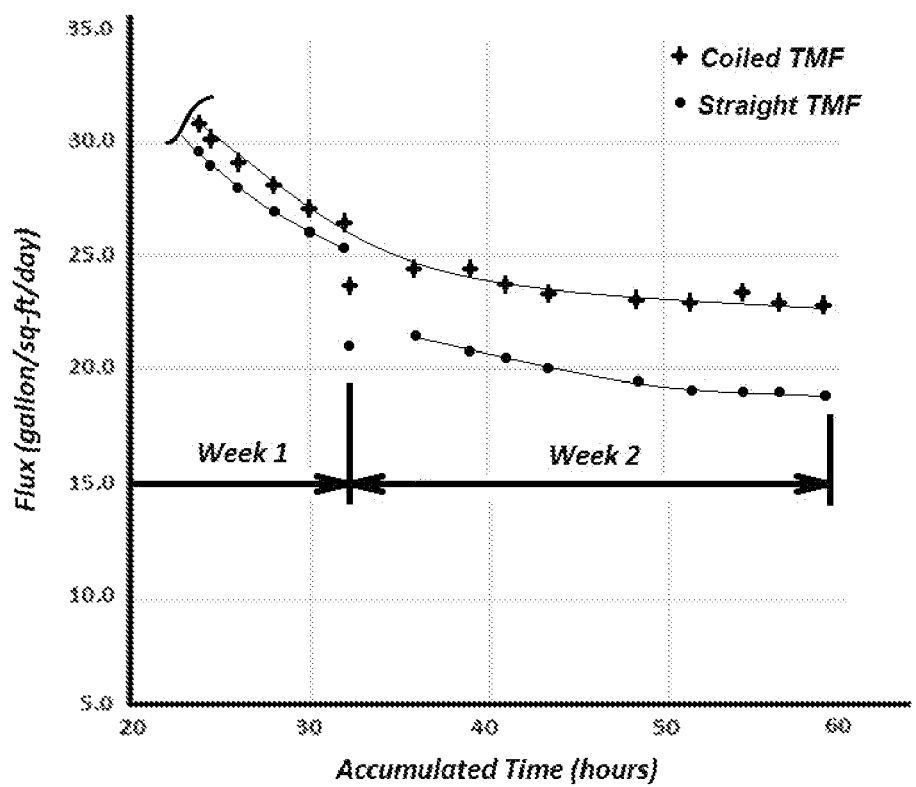
FIG. 11 is an exemplary chart of permeate flux rate from exemplary embodiments of the unhoused filtration devices in gallons per square foot of filtration tube per day.

Referring now to the FIG. 11 there is illustrated an exemplary chart of permeate P flow rate from filtration tube 13 of FIGS. 4 and 7B coiled TMF (cTMF) flux (gallons per square foot of interior surface 82 of filtration tube 13 per day—gfd) verses conventional straight TMF (tubular membrane filter) running side-by-side under a feed rate of 2.65 gpm and a trans-membrane pressure of 5.8 psi, processing fluid feed FF, a highly concentrated fluid (well water loaded with 1000 ppm fine ISO test dust, particles Pt) from a common tank was circulated through both filters. As shown in FIG. 11, the initial flux rate of permeate P began to differentiate once a cake of test dust was formed on the interior membrane surface, interior surface 82 of filtration tube 13 by the end of week one. By allowing particles Pt in the processed fluid, fluid feed FF, to settle on the membrane surface, (stop the operation for two days between Week 1 and Week 2) the test data indicates that more than 20% difference in flux rate (Note that both filters showed a significant drop of flux at the onset of Week 2. However, the flux of cTMF was able to resume and follow the original curve after several hours into operation. The straight TMF had very limited improvement and remained gap-down in the curve.), permeate P flow rate, between filtration tube 13 of FIGS. 4 and 7B coiled TMF (cTMF) as compared to conventional straight TMF (tubular membrane filter). Moreover, the flux rate, permeate P flow rate, of filtration tube 13 of FIGS. 4 and 7B coiled TMF (cTMF) degrade less over time as compared to conventional straight TMF (tubular membrane filter and indicates the effectiveness of secondary flow currents, particularly Dean Flow currents, in clearing the filter media of filtration tube 13 when filtration tube 13 is configured in a series of loops 20 and coiled around a center line CL.

Unhoused filtration device 10 exhibits superior flux-rate, permeate P flow rate, across the filter media of filtration tube 13 for a longer period of time when Dean Flow currents are induced in filtration tube 13. Dean Flow filtration thus provides for a longer mean-time between required backwashing of filtration tube 13 and better permeate P flow rate through filtration tube 13. Previous tests of conventional straight TMF without filtration tube 13 configured in a series of loops 20 and/or coiled around a center line CL demonstrated a significant build-up of particulate towards the inlet end of the filter media while tests employing the addition of filtration tube 13 with configured in a series of loops 20 and/or coiled around a center line CL and secondary flow generation have demonstrated significant reduction in particulate build-up on filter media of filtration tube 13.

Moreover, the data set forth in the chart of the FIG. 11 shows filtration tube 13 configured in a series of loops 20 and/or coiled around a center line CL and having secondary flow generation has an extended service life compared to conventional straight TMF. For example, if 20 gfd is set as the end of the filter service life, the conventional straight TMF (round dots) reaches the end of the service life in about 43 hours. The flux rate, permeate P, of filtration tube 13 configured in a series of loops 20 and/or coiled around a center line CL (square dots) reaches a steady operating state at 23 gfd, which means it will be in service for a longer duration of time.

With respect to the above description then, it is to be realized that the optimum dimensional relationships, to include variations in size, materials, shape, form, position, function and manner of operation, assembly and use, are intended to be encompassed by the present disclosure.

Figure 12:
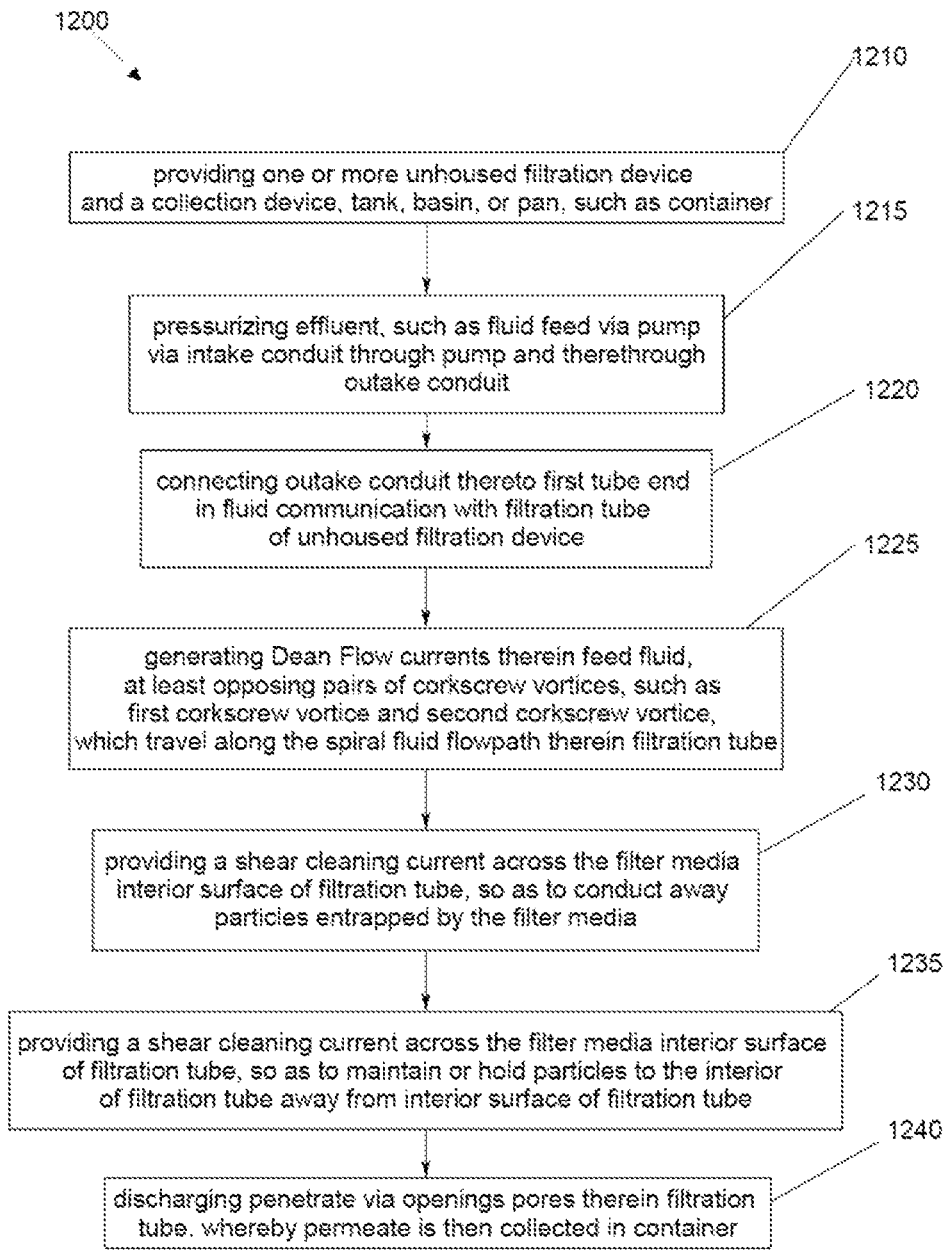
FIG. 12 is a flow diagram of a method of use of one or more unhoused filtration devices to filter a portion of suspended substances from an effluent.

Referring now to FIG. 12, there is illustrated a flow diagram 1200 of a method of use of one or more unhoused filtration device 10 in a filtration system. In block or step 1210, providing one or more unhoused filtration device 10 and a collection device, tank, basin, or pan, such as container 140. In block or step 1215 pressurizing effluent, such as fluid feed FF via pump 130 via intake conduit 131 through pump 130 and therethrough outtake conduit 132. In block or step 1220, connecting outtake conduit 132 thereto first tube end 31 in fluid communication with filtration tube 13 of unhoused filtration device 10. In block or step 1225 generating Dean Flow currents therein feed fluid FF, at least opposing pairs of corkscrew vortices, such as first corkscrew vortex CC1 and second corkscrew vortex CC2, which travel along the spiral fluid flow path therein filtration tube 13. In block or step 1230, providing a shear cleaning current across the filter media interior surface 82 of filtration tube 13, so as to conduct away particles Pt entrapped by the filter media. In block or step 1235, providing a shear cleaning current across the filter media interior surface 82 of filtration tube 13, so as to maintain or hold particles Pt to the interior I of filtration tube 13 away from interior surface 82 of filtration tube 13. In block or step 1240, discharging penetrate P via openings pores Po therein filtration tube 13, whereby permeate P is then collected in container 140.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A filter for filtering a pressurized feed fluid with a fluid permeate and suspended particles therethrough and discharging a concentrate fluid with suspended particles, the filter comprising:
an unhoused filtration tube having an inside and an outside, said filtration tube configured in a series of loops coiled around a center line having a first loop and an end loop;
a meshed sleeve utilized to encase said unhoused filtration tube to maintain said series of loops coiled around said center line;
wherein said first loop includes a first extension in fluid communication with said first loop;
wherein said end loop includes a second extension positioned therethrough said series of loops, extends adjacent thereto said first extension, in fluid communication with said end loop; and
wherein said unhoused filtration tube filters the pressurized feed fluid therethrough said series of loops by pushing the fluid permeate from said inside of said filtration tube to said outside of said filtration tube.

2. The filter of claim 1, further comprising a pump in fluid communication with said first loop of said filtration tube and a container configured to collect a permeate filtered therethrough said filtration tube.

3. The filter of claim 2, further comprising two or more manifold, each said manifold having two or more ports, said two or more ports includes a first port in fluid communication with a second port and a third port, wherein said second port of a first manifold is in fluid communication with said first loop and said third port of a second manifold is in fluid communication with said second loop.

4. The filter of claim 3, wherein said filtration tube further comprises two or more of said filtration tube including at least a first filtration tube and at least a second filtration tube.

5. The filter of claim 4, wherein said two or more manifold includes a first manifold and a second manifold, wherein said pump is in fluid communication with said first port of said first manifold and said second port is in fluid communication with said first extension of said first filtration tube and said third port of said first manifold is in fluid communication with said first extension of said second filtration tube.

6. The filter of claim 5, wherein said second port of said second manifold is in fluid communication with said second extension of said first filtration tube and said third port of said second manifold is in fluid communication with said second extension of said second filtration tube.

7. The filter of claim 6, wherein said first port of said second manifold is configured to discharge the concentrate fluid with the suspended particles.

8. The filter of claim 1, wherein said second extension extends to a position proximate said first extension and said first loop.

9. The filter of claim 8, wherein said first extension is positioned within said series of loops proximate said center line.

10. The filter of claim 9, further comprising a meshed sleeve configured to encase said filtration tube.

11. The filter of claim 9, wherein said second extension is positioned within said series of loops.

12. The filter of claim 9, wherein said second extension is positioned exterior to said series of loops.

13. The filter of claim 12, further comprising a pump in fluid communication with said first extension of one or more said filtration tube and a container configured to collect a permeate filtered therethrough said filtration tube.

14. The filter of claim 13, further comprising two or more input manifold, each said input manifolds having two or more ports, said two or more ports includes a first port in fluid communication with a second port and a third port, wherein said second port of a first manifold is in fluid communication with said first loop and said third port of a second manifold is in fluid communication with said second loop.

15. The filter of claim 14, wherein said filtration tube further comprises two or more of said filtration tube including at least a first filtration tube and at least a second filtration tube.

16. The filter of claim 15, wherein said one or more input manifold includes a first manifold and a second manifold, wherein said pump is in fluid communication with said first port of said first input manifold and said second port is in fluid communication with said first extension of said first filtration tube and said third port of said first manifold is in fluid communication with said first extension of said second filtration tube.

17. The filter of claim 16, wherein said second port of said second input manifold is in fluid communication with said second extension of said first filtration tube and said third port of said second input manifold is in fluid communication with said second extension of said second filtration tube.

18. The filter of claim 17, wherein said first port of said second manifold is configured to discharge the concentrate fluid with the suspended particles.

19. The filter of claim 13, further comprising two or more input manifold and one or more output manifold, each said input manifold having a first port in fluid communication with a second port and a third port and each said output manifold having a first port in fluid communication with a second port, a third port, a fourth port, and a fifth port.

20. The filter of claim 19, wherein said filtration tube further comprises four or more of said filtration tube including a first filtration tube, a second filtration tube, a third filtration tube, and a fourth filtration tube.

21. The filter of claim 20, wherein said two or more input manifold includes a first input manifold and a second input manifold, wherein said pump is in fluid communication with said first port of said first input manifold and said second input manifold, said second port of said first input manifold is in fluid communication with said first extension of said first filtration tube, said second port of said second input manifold is in fluid communication with said first extension of said second filtration tube, said third port of said first input manifold is in fluid communication with said first extension of said third filtration tube and said third port of said second input manifold is in fluid communication with said first extension of said fourth filtration tube.

22. The filter of claim 21, wherein said second port of said output manifold is in fluid communication with said second extension of said first filtration tube, said third port of said output manifold is in fluid communication with said second extension of said second filtration tube, said fourth port of said output manifold is in fluid communication with said second extension of said third filtration tube, and said fifth port of said output manifold is in fluid communication with said second extension of said fourth filtration tube.

23. The filter of claim 22, wherein said first port of said output manifold is configured to discharge the concentrate fluid with the suspended particles.

24. The filter of claim 1, wherein said series of loops of said filtration tube is configured to produce one or more Dean Flow currents in the pressurized feed fluid therein said filtration tube.

25. The filter of claim 24, wherein said one or more Dean Flow currents includes opposing pairs of corkscrew vortices.

26. The filter of claim 1, further comprising an unpressurized tank positioned adjacent said unhoused filtration tube to collect the fluid permeate.

27. A filter for filtering a feed fluid with a fluid permeate and suspended particles by vacuum and discharging the fluid permeate without the suspended particles, the filter comprising:

an unhoused filtration tube having an inside and an outside, said filtration tube configured in a series of loops coiled around a center line having a first loop and an end loop;
a meshed sleeve configured to encase said unhoused filtration tube to maintain said series of loops coiled around said center line;
wherein said first loop includes a first extension in fluid communication with said first loop;
wherein said end loop includes a second extension positioned therethrough said series of loops, extends adjacent thereto said first extension, and in fluid communication with said end loop; and
wherein said unhoused filtration tube filters the pressurized feed fluid therethrough said series of loops by pulling the fluid permeate from said outside of said filtration tube to said inside of said filtration tube.

* * * * *